United States Patent [19]

Valentine

[11] Patent Number: 4,850,801
[45] Date of Patent: Jul. 25, 1989

[54] AIRCRAFT PROPELLER BLADE RETENTION

[75] Inventor: Peter L. Valentine, Bartlesville, Okla.

[73] Assignee: United Technologies Corporation, Hartford, Conn.

[21] Appl. No.: 135,779

[22] Filed: Dec. 21, 1987

[51] Int. Cl.⁴ ............................................. B64C 11/06
[52] U.S. Cl. .................................... 416/205; 416/147
[58] Field of Search .................... 416/205, 147, 204

[56] References Cited

U.S. PATENT DOCUMENTS

| | | | |
|---|---|---|---|
| 2,460,910 | 2/1949 | Sheets et al. | 416/240 A X |
| 2,499,837 | 3/1950 | Sheets et al. | 416/220 A X |
| 2,628,687 | 2/1953 | Allen | 416/205 |
| 2,628,688 | 2/1953 | Diefenderfer | 416/205 |
| 2,652,123 | 9/1953 | Kearns | 416/205 |
| 3,029,876 | 4/1962 | Scott | 416/205 |
| 3,040,817 | 6/1962 | Elmes et al. | 416/220 A X |

Primary Examiner—Everette A. Powell, Jr.

[57] ABSTRACT

Preloading and retention of an aircraft propeller blade (12) are achieved by a preloading mechanism (85) received within an outer portion of a hub barrel(30) within which the blade is received. The preloading mechanism comprises an annular fastener (90) threaded into the barrel. A splined lock ring (125) prevents loosening or disengagement of the fastener from the barrel. Location of the preloading mechainsm at an outer location of the barrel allows the primary centrifugal load path from the blade into the barrel to be free from discontinuities and attendant stress concentrations.

2 Claims, 2 Drawing Sheets

AIRCRAFT PROPELLER BLADE RETENTION

TECHNICAL FIELD

This invention relates generally to variable pitch aircraft propeller blades and particularly to an improved retention arrangement therefor.

BACKGROUND ART

The maintenance of a predetermined stiffness in aircraft propellers is critical for a number of reasons. Foremost among such reasons are controlling the natural frequencies of the propeller blades in both flatwise and edgewise modes of vibration and to enhance the blades ability to react aerodynamic moments thereon.

It is well known that enhancing the stiffness of a propeller blade increases the natural edgewise and flatwise vibrational frequencies thereof. It is critical that such natural frequencies be of values greater than twice the rotational frequency of the engine powering the propeller, so that engine vibration will contribute minimally to the risk of damage to the propeller blade due to the reinforced natural vibration thereof. Imparting sufficient stiffness to an aircraft propeller blade, will raise these natural frequencies of vibration to such a safe level.

Factors such as a propeller's angle of attack, wind direction and ground effects can cause airflow into an aircraft propeller to be offset from a direction parallel to the axis of rotation of the propeller. It is well known that such offset air inflow to the propeller causes the application of aerodynamic moments to the propeller blades, about axes perpendicular to the pitch change axes thereof. Such moments can be of such severity as to induce a rocking motion of the blades on the pitch change bearings thereof, thereby increasing localized loading in such bearings and in so doing, risking the disintegration thereof.

There are two well known techniques for imparting sufficient stiffness to aircraft propeller blades. One such technique involves the use of materials in the blades, which, when centrifugally loaded under operating conditions, exhibit a required stiffness. Many prior art steel and aluminum propeller blades have sufficient inherent stiffness when centrifugally loaded, to impart to the blades, the desirable vibrational and structural characteristics noted above. However, modern, lightweight composite propeller blades are not massive enough to achieve sufficient stiffness when centrifugally loaded and, therefore, must rely on radially outward preloading of the blade shank against the pitch change bearings thereof, to achieve requisite stiffness.

It has been the practice to achieve such radially outward preloading of a composite blade against the pitch change bearings therefor, with various mounting arrangements by which the blade is retained within the hub. Such arrangements often involve threaded fasteners, split rings, and the like which define discontinuities and, therefore, locations of stress concentrations in the primary load path through the hub when subjected to the high centrifugal loading which the blade undergoes during operation thereof. Furthermore, such preloading mechanisms may require complicated and time consuming disassembly techniques for blade removal and replacement.

DISCLOSURE OF INVENTION

Accordingly, it is a principal object of the present invention to provide an improved propeller blade retention arrangement.

It is another object of the present invention to provide such a retention arrangement which imparts sufficient stiffness to an associated propeller blade.

It is another object of the present invention to provide such a retention arrangement wherein centrifugal blade loading due to operation of the propeller is applied through continuous, uninterrupted regions of the propeller hub to reduce areas of high stress concentrations therein.

It is yet another object of the present invention to provide such a blade retention arrangement which is easily assembled and disassembled for blade removal and replacement.

In accordance with the present invention, a propeller blade is retained within a hub barrel and preloaded by means of an arrangement disposed at the radially outermost portion of the barrel, whereby the prime path of barrel loading due to the centrifugal force of the blade thereon at a radially inner location in the barrel is continuous, and uninterrupted by any fasteners which would otherwise define high stress concentrations therein. The preloading means is adjustable to provide radially outward compressive loading on a primary pitch change bearing which is formed by the blade shank of the blade, the continuous inner portion of the barrel, and a plurality of rotary bearing elements received therebetween. The preloading means also forms the outer race of a secondary pitch change bearing. The preloading means comprises a fastener in threaded engagement with an interiorly threaded, radially outer portion of the barrel. The threads on the fastener and the barrel are provided with a plurality of keyways which receive a plurality of splines on a locking ring which locks the fastener to the barrel, thereby preventing disengagement of the fastener therefrom. The preloading mechanism also allows the blade to be removed and replaced merely by disengagement of the preloading mechanism from the radially outer end of the barrel without significant disassembly of the hub in toto.

BEST MODE FOR CARRYING OUT THE INVENTION AND INDUSTRIAL APPLICABILITY THEREOF

Figure 1:
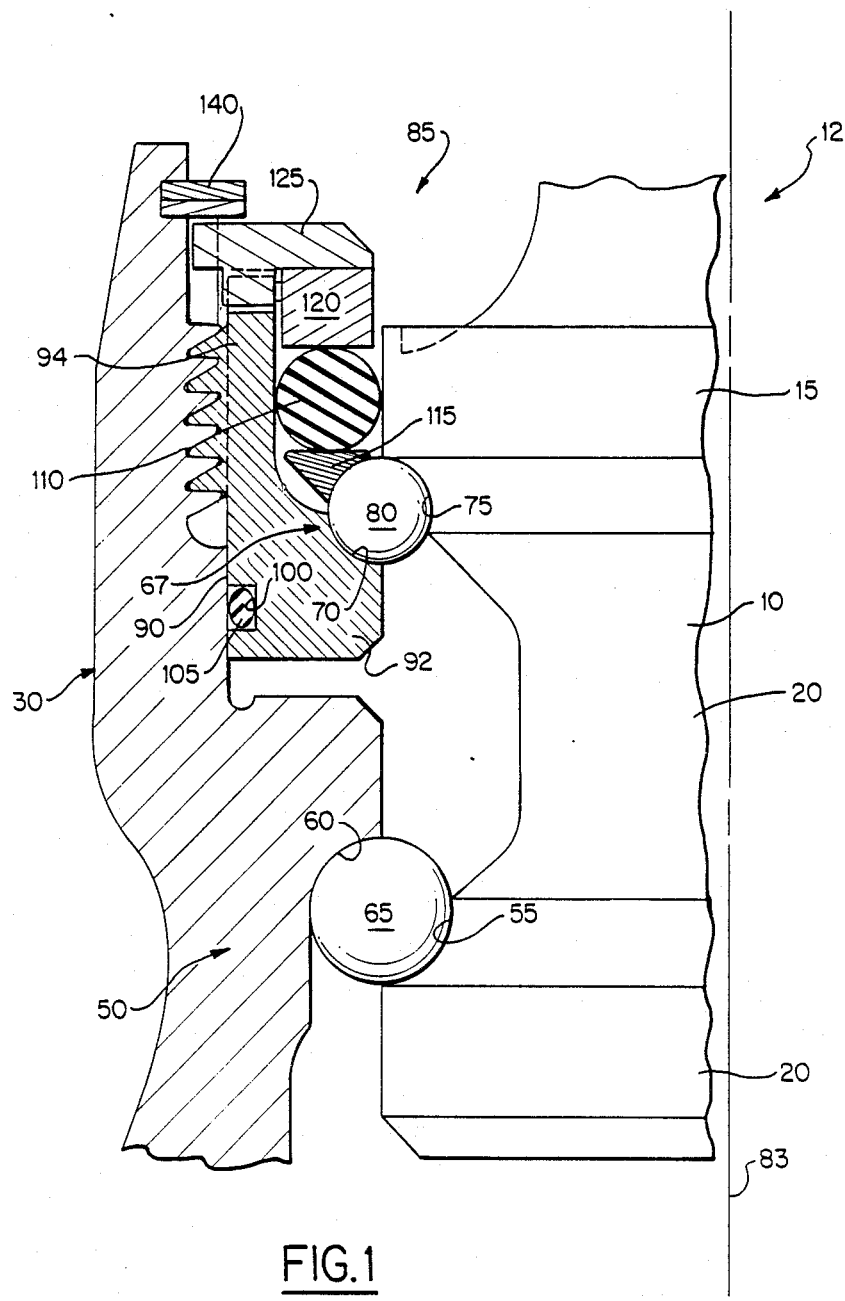
FIG. 1 is a fragmented, sectioned elevation of the retention of an individual propeller blade in a hub barrel, in accordance with the present invention.

Referring to FIG. 1, the shank 10 of an aircraft propeller blade 12 comprises first and second shoulders 15 and 20 with a reduced diameter medial portion 25 therebetween, it being understood that the radially outer airfoil portion of the blade extends (in FIG. 1) upwardly from this shank.

The shank is received within a generally cylindrical propeller hub barrel 30, each blade of a multi-bladed propeller being received within a similar, individual barrel. In accordance with the present invention, and as is known in the art, the barrels may be formed integrally into a single, one-piece hub which in addition to providing a mounting location for the blades, may house the propeller's pitch control and pitch actuation systems.

A radially outer portion of the barrel is internally threaded at 35 (FIG. 2) the threads being provided with a multiplicity of spaced radially extending keyways 40 therein. The radially outer portion of the barrel is also provided with an annular slot 45.

The radially inner portions of the blade shank and barrel define a primary pitch change bearing 50. The bearing comprises opposed races 55 and 60 machined into the blade shank and barrel respectively and a multiplicity of balls 65 received between the races and rotatable therewithin. A secondary pitch change bearing 67 located outwardly from the primary pitch change bearing comprises first and second races 70 and 75 and a multiplicity of balls 80 arranged therewithin. It will be appreciated that the pitch of blade 10 may be changed by rotation thereof on the primary and secondary pitch change bearings, about a pitch change axis 83.

Figure 2:
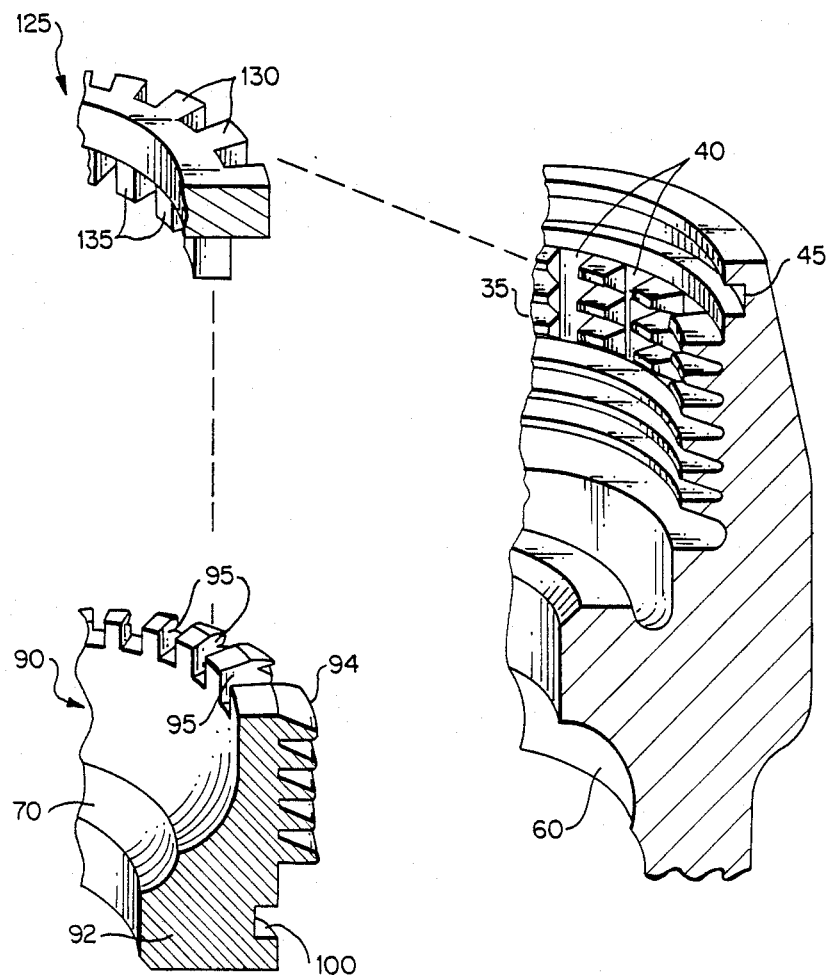
FIG. 2 is an exploded perspective view of a blade preloading mechanism employed in the present invention.

A preloading mechanism 85 comprises an exteriorly threaded fastener (nut) 90 which is maintained in threaded engagement with threaded portion 35 of barrel 30. The nut includes a radially inner shoulder 92 and radially outer threaded portion 94. As best seen in FIG. 2, the threads of fastener 90 include a multiplicity of radially oriented keyways 95 therewithin. Nut 90 also includes an annular groove 100 about the radially inner portion of the lateral surface thereof, groove 100 accommodating a static O-ring seal 105. A spherical groove is provided in the inner surface of shoulder 92 and forms race 75. A dynamic O-ring seal 110 which is held in place in part by a seal keeper 115 which may also function as a separator for balls 80 in secondary pitch change bearing 65, is maintained between shoulder 15 on blade shank 10 and outer portion 94 of nut 90. Seal 110 is also held in place by a plurality of spacer blocks 120 which are radially restrained with seal 110 by a lock ring 125. As best seen in FIG. 2, lock ring 125 includes a set of outer splines 130 which are received within keyways 40 in barrel 35 and inner splines 135 received within keyways 95 in nut 90. Splines 130 and 135 prevent the relative rotation of the nut and the hub barrel thereby maintaining the radial retention of blade shank 10 within the barrel. The lock ring is retained in place by a retaining ring 140 bearing thereagainst and received within groove 45 at the outer end of the barrel.

As set forth hereinabove, to provide the propeller with acceptable vibrational and aerodynamic load reaction characteristics, the blade must be preloaded. That is, the blade shank must be urged radially outwardly against the pitch change bearings. As further set forth hereinabove, to enhance the strength with which the blade is retained within the barrel under operating conditions, it is desirable that the primary centrifugal load path from the blade through the pitch change bearing and into the barrel not include any discontinuities such as threads, split rings or other fasteners which would introduce stress concentrations into the assembly. This is accomplished in the present invention by locating the nut, the threaded portion of the barrel and the locking ring, outwardly from the primary pitch change bearing whereby the primary load path from the bearing into the hub extends from shoulder 20 of the blade shank, through balls 65 into race 60 and through the continuous, homogeneous, radially inner portion of the barrel. All discontinuities due to the interengagement of the preloading and locking components are located at a radially outer location on the hub barrel, where stresses are lower.

It will be understood that such enhanced centrifugal load accommodation is not attained at the expense of convenience and simplicity. The blade is readily removed from the barrel for repair or replacement merely by removing retaining ring 140 from the end of the barrel, and sliding lock ring 125 outwardly, thereby removing the lock ring from the hub. Spacer block 120 and dynamic seal 110 are easily removed in the same manner. Nut 90 is then screwed inwardly (downwardly in FIG. 1), lowering the blade, releasing balls 65 and 80, and relieving the preload on the blade shank. The nut may then be unscrewed from the barrel and the blade slipped out of its mounting.

To replace the blade, the blade shank is merely slipped into the barrel and balls 65 inserted within races 55 and 60. Nut 90 is then screwed into the barrel and balls 80 inserted within races 70 and 75. The nut is then screwed radially outwardly, thereby lifting the blade shank outwardly balls 80 and applying a desired amount of radially outward preload to the shank, against the pitch change bearings. Seal 110, spacer blocks 120 and lock ring 125 are then slipped down over the nut and the entire assembly locked in place by the insertion of retaining ring 140 within groove 45.

While a specific embodiment of the present invention has been described and illustrated, it will be appreciated that various modifications may be made without departing from the present invention and it is intended by the following claims to cover all such modifications as fall within the true spirit and scope of this invention.

Having thus described the invention, what is claimed is:

1. An arrangement for mounting a variable pitch propeller blade to a hub therefor, said arrangement being characterized by:
    a blade having a shank including a radially inner portion;
    a hub having a barrel including an internally threaded, radially outer portion with a plurality of radially extending keyways therewithin, and a generally continuous radially inner portion;
    a primary pitch change bearing comprising a plurality of rotary bearing elements disposed between said radially inner portions of said blade shank and barrel;
    a secondary pitch change bearing, said secondary pitch change bearing comprising:
        an externally threaded fastener having a plurality of radially extending keyways therewithin, said externally threaded fastener being in engagement with said internally threaded, radially outer portion of said barrel, said externally threaded fastener retaining said propeller blade shank within said barrel and preloading said propeller blade shank radially against said barrel through said primary and secondary pitch change bearings and
        a plurality of rotary bearing elements disposed between said blade shank outer portion and said externally threaded fastener whereby said externally threaded fastener comprises a race for said secondary pitch change bearing and
    a locking ring provided with first and second annular sets of splines receivable within said barrel and fastener keyways to prevent unwanted mutual relative rotation therebetween.

2. The propeller blade mounted arrangement of claim 1 and further including a retaining ring disposed radially outwardly of said locking ring, said retaining ring being received within a slot within the interior of said barrel in abutment with said locking ring for the radial retention thereof.

* * * * *